United States Patent [19]

Lay

[11] Patent Number: 4,698,216
[45] Date of Patent: Oct. 6, 1987

[54] PRODUCTION OF AN AQUEOUS PHOSPHORIC ACID SOLUTION

[75] Inventor: Manchiu D. Lay, Hastings, N.Y.

[73] Assignee: Stauffer Chemical Company, Westport, Conn.

[21] Appl. No.: 894,528

[22] Filed: Aug. 8, 1986

[51] Int. Cl.[4] .............................................. C01B 25/12
[52] U.S. Cl. ..................................... 423/317; 423/304
[58] Field of Search ................................. 423/304, 317

[56] References Cited

U.S. PATENT DOCUMENTS

| 1,848,295 | 3/1932 | Ipatiew | 423/317 |
| 1,895,329 | 1/1933 | Ipatiew et al. | 423/317 |
| 1,940,758 | 12/1933 | Lehrecke | 423/317 |
| 2,708,620 | 5/1955 | Winnicki | 423/317 |
| 3,436,184 | 4/1969 | Hinkebein | 23/223 |
| 4,309,394 | 1/1982 | Hudson | 423/317 |
| 4,603,039 | 7/1986 | Kuxdorf et al. | 422/188 |

FOREIGN PATENT DOCUMENTS 697401 11/1979 U.S.S.R. .............................. 423/317

OTHER PUBLICATIONS

Phosphorus and Its Compounds, J. R. Van Wazer, ed., vol. II, pp. 1209–1213 (1961).
Supplement to Mellor's Inorganic and Theoretical Chemistry, vol. VIII, Supp. III, pp. 665–667 (1971).
Chemical Abstracts, vol. 97, 25820h (1982).
Chemical Abstracts, vol. 92, 43923v (1980).
Chemical Abstracts, 1937, 221[3].
Chemical Abstracts, vol. 30, 7787[9].
Chemical Abstracts, 1934, 3678[5] and 3678[8].
Chemical Abstracts, 1934, 1594[3].
Chemical Abstracts, vol. 82, 19061k (1975).
Chemical Abstracts, vol. 96, 37770j (1982).

Primary Examiner—John Doll
Assistant Examiner—Wayne A. Langel
Attorney, Agent, or Firm—Richard P. Fennelly

[57] ABSTRACT

Aqueous phorphoric acid solutions are produced by contacting an elemental phosphorus-containing material with an oxygen-containing gas, while both are finely divided and well mixed together in a reactor vessel, while the phosphorus-containing material is otherwise protected from direct contact with oxygen in the atmosphere by being blanketed with a protective aqueous layer, and removing and recovering the heat generated in the reactor vessel (e.g., by means of a heat exchanger) due to the contact between the oxygen in the oxygen-containing gas and the elemental phosphorus in the elemental phosphorus-containing material. The technique is useful for the production of phosphoric acid from substantially pure elemental phosphrous.

9 Claims, 1 Drawing Figure

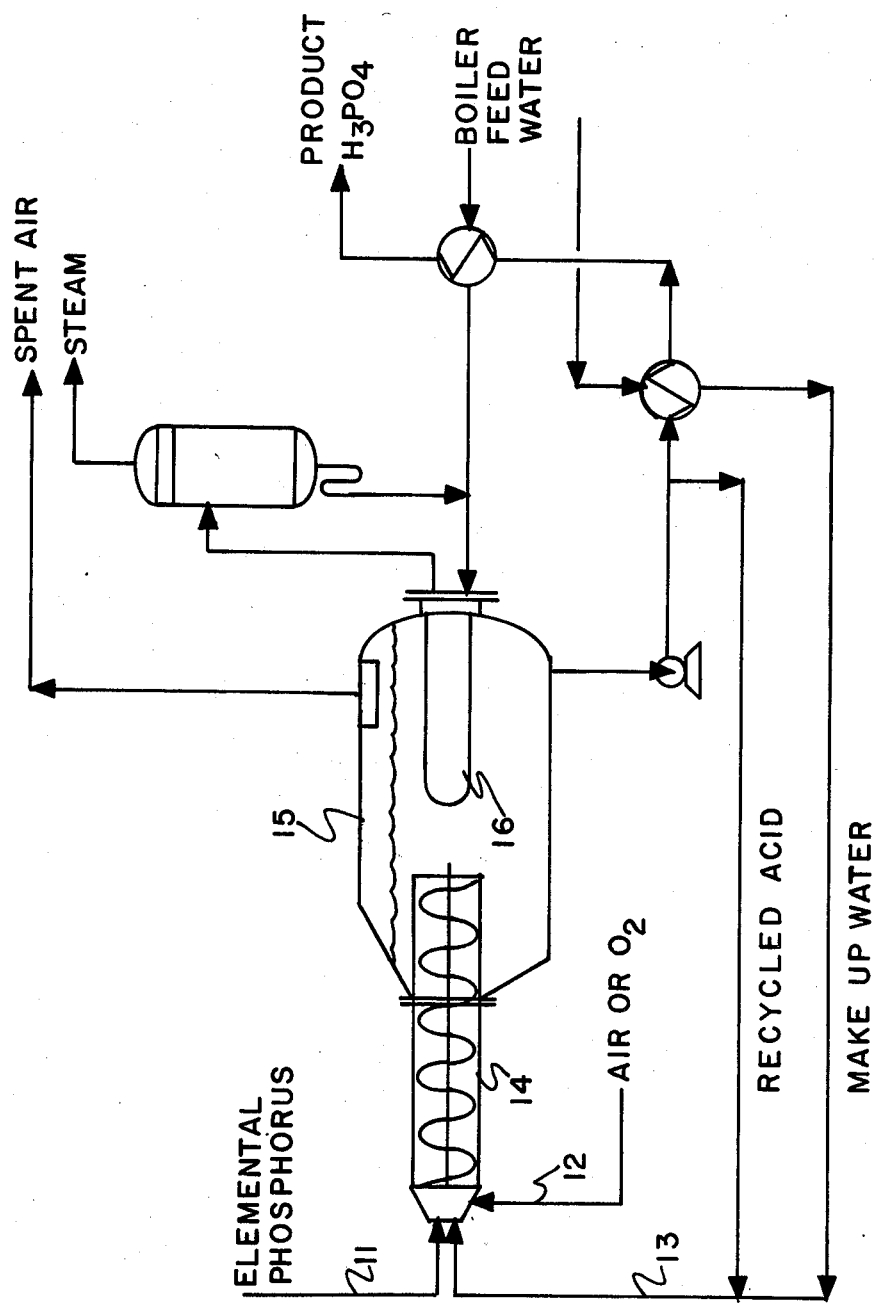

PRODUCTION OF AN AQUEOUS PHOSPHORIC ACID SOLUTION

BACKGROUND OF THE PRESENT INVENTION

1. Field of the Invention

The present invention relates to the production of an aqueous phosphoric acid solution from elemental phosphorus material.

2. Description of the Prior Art

Phosphoric acid is currently commercially manufactured by either the wet process or the furnace process. In the wet process technique, the phosphoric acid is manufactured by digestion of phosphate rock (apatite forms) with sulfuric acid. The phosphoric acid is then separated from the resulting calcium sulfate slurry by filtration.

In the manufacture of phosphoric acid from elemental phosphorus, white or yellow phosphorus is burned in excess air, the resulting phosphorus pentoxide is then hydrated in a separate step, the heats of combustion and of hydration are removed, and the phosphoric acid mist is collected. The technique of burning the elemental phosphorus in excess air is highly exothermic generating extremely large amounts of heat. John R. Van Wazer, "Phosphorus and its Compounds", Volume II (1961), page 1209, indicates that there have not been successful ways to convert the heat liberated from the exothermic burning of phosphorus to either mechanical or other useful energy primarily because of the extremely corrosive nature of the system involved. Therefore, persons of ordinary skill in the art have generally allowed the heat to escape with a substantial loss of heat energy. Phosphorus furnace plants are rather large and expensive to build since they need special materials to withstand the exothermic and corrosive nature of the various reaction conditions existing therein.

U.S.S.R. Pat. No. 697,401 describes the treatment of phosphorus-containing sludge, while being heated, with an oxygen-containing gas, apparently in the absence of an aqueous covering layer. The treated sludge is then treated in a fluidized bed at elevated temperature to yield a granular product, rather than a solution, having an increased $P_2O_5$ content.

DESCRIPTION OF RELATED DEVELOPMENT

In co-pending U.S. patent application Ser. No. 894,529, filed on Aug. 8, 1986, entitled "Treatment of Pyrophoric Elmental Phosphorus-Containing Material", a process is described wherein pyrophoric elemental phosphorus-containing material is treated by contacting the material with an oxygen-containing gas to convert it to a substantially less pyrophoric form while it is otherwise protected from direct contact with oxygen in the atmosphere by being blanketed with a non-flammable fluid. One of the blanketing fluids that is described is an aqueous covering layer. That copending application mentions the production of a phosphoric acid solution from elemental phosphorus material without first mixing the oxygen-containing gas and the phosphorus material so that they are in mixed, finely divided form when in the aqueous covering layer. The present invention can be considered to be an improvement of the general procedure described in the co-pending application wherein that procedure is modified to achieve an economical means for the production of aqueous phosphoric acid solutions, e.g., substantially pure thermal phosphoric acid, by premixing the oxygen gas and phosphorus material so that they are brought together in mixed, finely divided form in the aqueous covering layer.

SUMMARY OF THE PRESENT INVENTION

The present invention is a process for the production of an aqueous phosphoric acid solution which comprises contacting an elemental phosphorus-containing material with an oxygen-containing gas, when both are in well-mixed, finely divided form in the liquid aqueous covering phase, in a reactor vessel. The contacting takes place while the phosphorus-containing material is otherwise protected from direct contact with vapor phase oxygen in the atmosphere by being blanketed with a protective aqueous layer. The contacting with the oxygen converts the phosphorus-containing material to $P_2O_5$ values which are soluble in the aqueous layer thereby forming an aqueous phosphoric acid solution. In a preferred embodiment, the phosphorus-containing material is substantially pure elemental phosphorus with the result that the phosphoric acid solution is a substantially pure phosphoric acid solution provided substantially pure water is used as the blanketing layer. The present process also includes the essential step of removing and recovering the heat generated in the reactor vessel arising from the contact of oxygen and the elemental phosphorus.

DESCRIPTION OF THE DRAWING

The Drawing illustrates one embodiment of the present invention and shows the liquid phase oxidation of phosphorus to phosphoric acid with appropriate heat recovery.

DESCRIPTION OF PREFERRED EMBODIMENTS OF THE PRESENT INVENTION

The present invention relies, in part, upon the blanketing of an elemental phosphorus-containing material (e.g., substantially pure elemental phosphorus) with an aqueous layer which yields a liquid-phase reaction of phosphorus and oxygen to form $P_2O_5$ with simultaneous absorption of the $P_2O_5$ in the aqueous layer. Reaction in the liquid phase allows the entire operation to take place under very much lower temperature since the liquid serves as a heat sink facilitating the transfer of the heat of reaction thereby serving to maintain the relatively low temperature of the system. While the elemental phosphorus-containing material is contained in the aqueous layer, it is contacted with an oxygen-containing gas while both are in finely divided form and have been finely mixed together. This assures good reactivity between the elemental phosphorus and oxygen while in the aqueous media of choice. The oxygen-containing gas can be air, if desired.

The resulting contact between the oxygen in the air with the elemental phosphorus contained in the aqueous layer results in an oxidation of the elemental phosphorus to $P_2O_5$ values with the generation of heat due to the exothermic nature of the reaction. The $P_2O_5$ becomes dissolved in the aqueous medium forming a phosphoric acid solution. If desired, the aqueous media can be a dilute phosphoric acid aqueous solution if concentration of the resulting product is desired. The use of an aqueous basic solution (e.g., of NaOH, NH$_4$OH, etc.) can be used if a phosphate salt product is desired. The heat that is generated from the liquid phase oxidation is recovered and is removed from the reactor vessel in which the elemental phosphorus, oxygen-containing gas, and water residue so that the temperature within the reactor environment is maintained in the approximate range of from about 300° F. to about 400° F. The excess heat can be most preferably removed in the form of steam which can be recycled for appropriate use should the present invention be used, as preferred, in a plant environment.

The Drawing illustrates one possible embodiment of the present invention. Elemental phosphorus feed 11, an oxygen-containing gas feed 12, and an aqueous solution feed 13 (the latter to serve as the blanketing agent) are fed to an appropriate liquid/gas static mixer 14 (e.g., of the type available from KOMAX) which produces a generally homogeneous mixture of finely divided elemental phosphorus and oxygen gas within the aqueous blanketing layer. The mixer also serves as a reactor vessel for the phosphorus and oxygen until they reach vessel 15 which contains heat exchanger 16 which can maintain the temperature inside vessel 15 at 300° F. to 400° F. while providing steam for desired energy usage.

A typical calculated heat and material balance for the system shown in the Figure is as follows:

| In | | Out | |
| --- | --- | --- | --- |
| Phosphorus | 1000 lbs | $O_2$ Vent | 323 lbs |
| Air | 6950 lbs | $N_2$ Vent | 5336 lbs |
| Total Water | 2435 lbs | Water | 516 lbs |
| | | $H_2PO_4$ (75%) | 4210 lbs |

The heat recovery would be 8.3 million BTU which is equivalent to 6500 lbs of steam. The recycle acid would be in the range of 200–500 gallons per minute.

The foregoing is intended to illustrate certain preferred embodiments of the present invention and should not be construed in a limiting sense. The scope of protection that is sought is set forth in the claims which follow.

I claim:

1. A process for the production of an aqueous phosphoric acid solution which comprises contacting an elemental phosphorus-containing material with an oxygen-containing gas, while both are in mixed, finely divided form, in a reactor vessel, while the phosphorus-containing material is otherwise protected from direct contact with oxygen in the atmosphere by being blanketed with a protective aqueous layer, whereby reaction of the elemental phosphorus and oxygen occurs in the liquid phase with absorption by the liquid phase of the resulting $P_2O_5$ values produced thereby to yield the phosphoric acid solution, and which also comprises removing and recovering the heat generated in the reactor vessel due to the contact of oxygen and the elemental phosphorus in the liquid aqueous layer.

2. A process as claimed in claim 1 wherein the elemental phosphorus-containing material and oxygen-containing gas are mixed in a liquid/gas mixer.

3. A process as claimed in claim 1 wherein the temperature in the reactor is maintained at from about 300° F. to about 400° F.

4. A process as claimed in claim 2 wherein the temperature in the reactor is maintained at from about 300° F. to about 400° F.

5. A process as claimed in claim 1 wherein substantially pure elemental phosphorus is utilized.

6. A process as claimed in claim 4 wherein substantially pure elemental phosphorus is utilized.

7. A process as claimed in claim 1 wherein the heat is recovered in the form of steam.

8. A process as claimed in claim 3 wherein the heat is recovered in the form of steam.

9. A process as claimed in claim 1 wherein the heat is recovered in the form of steam by means of a heat exchanger in contact with the aqueous layer.

* * * * *